US012759626B1

(12) United States Patent
Ezati et al.

(10) Patent No.: US 12,759,626 B1
(45) Date of Patent: Oct. 13, 2026

(54) SYSTEMS AND METHODS FOR ADJUSTING A STEERING WHEEL OF A VEHICLE DURING OPERATING MODE TRANSITIONS

(71) Applicant: GM GLOBAL TECHNOLOGY OPERATIONS LLC, Detroit, MI (US)

(72) Inventors: Mahdokht Ezati, Pickering (CA); Hojjat Izadi, Richmond Hill (CA); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/215,463

(22) Filed: May 22, 2025

(51) Int. Cl.
*B62D 6/00* (2006.01)
*B62D 15/02* (2006.01)

(52) U.S. Cl.
CPC ........... *B62D 6/008* (2013.01); *B62D 15/021* (2013.01)

(58) Field of Classification Search
CPC .......... B62D 6/00; B62D 6/002; B62D 6/005; B62D 6/008; B62D 6/02; B62D 5/0463; B62D 5/0466; B62D 15/021; B60W 10/20; B60W 60/00; B60W 60/0053; B60W 2520/10; B60W 2710/20
USPC .......................................... 701/37–41, 70–81
See application file for complete search history.

(56) References Cited

U.S. PATENT DOCUMENTS

| | | | | |
|---|---|---|---|---|
| 11,724,738 | B2 * | 8/2023 | Tyrrell | B62D 15/025 180/446 |
| 2017/0174259 | A1 * | 6/2017 | Meyhofer | F16D 48/06 |
| 2024/0182110 | A1 * | 6/2024 | Nakamura | B62D 1/06 |
| 2025/0313259 | A1 * | 10/2025 | Wong | B62D 5/006 |

FOREIGN PATENT DOCUMENTS

| | | | |
|---|---|---|---|
| DE | 102020106679 | A1 | 9/2020 |
| DE | 102024112705 | A1 | 10/2025 |

* cited by examiner

*Primary Examiner* — Logan M Kraft
*Assistant Examiner* — Johnny H Hoang
(74) *Attorney, Agent, or Firm* — Ingrassia Fisher & Lorenz, LLP | IFL

(57) ABSTRACT

Methods and apparatus are provided for adjusting a steering wheel during a transition from a hands-on mode of a vehicle to a hands-off mode. The systems include a controller in operable communication with an automated driving system (ADS), a road wheel control system, and a steering wheel control system. The controller is configured to receive a hands-on request instructing a driver to grip the steering wheel, determine an expected steering ratio and an expected transition duration, determine a steering ratio trajectory based on the current steering ratio, the expected steering ratio, and the expected transition duration, wherein the steering ratio trajectory includes a series of reference steering ratios at corresponding times during the expected transition duration, and transition from the current steering ratio to the expected steering ratio using the steering ratio trajectory.

20 Claims, 7 Drawing Sheets

SYSTEMS AND METHODS FOR ADJUSTING A STEERING WHEEL OF A VEHICLE DURING OPERATING MODE TRANSITIONS

INTRODUCTION

The technical field generally relates to vehicle systems, and more particularly relates to smoothly adjust a steering ratio during transition from a hands-off mode of a vehicle to a hands-on mode of the vehicle.

The operation of modem vehicles is becoming more automated, that is, able to provide driving control with less driver intervention. In general, autonomous vehicles are vehicles that are capable of sensing their environment and navigating with little or no user input. Autonomous vehicles may sense their environment using sensing devices such as radar, lidar, image sensors, and the like. Autonomous vehicles may further use information from global positioning systems (GPS) technology, navigation systems, vehicle-to-vehicle communication, vehicle-to-infrastructure technology, and/or drive-by-wire systems for navigation.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

As the industry transitions to autonomous vehicles, various opportunities may arise for improving user experience during autonomous operation of the vehicles. Accordingly, there is an ongoing desire for systems and methods that promote a positive user experience during autonomous vehicle operation. Furthermore, other desirable features and characteristics of the present disclosure will become apparent from the subsequent detailed description and the appended claims, taken in conjunction with the accompanying drawings and the foregoing introduction.

SUMMARY

A method is provided for adjusting a steering wheel during a transition from a hands-off mode of a vehicle to a hands-on mode. In one example, the method includes operating a vehicle in a hands-off mode wherein steering of the vehicle is controlled by an automated driving system (ADS) of the vehicle and a driver is not required to grip a steering wheel of the vehicle, receiving, by a controller having one or more processors, a hands-on request instructing the driver to grip the steering wheel prior to transitioning from the hands-off mode to a hands-on mode that requires the driver to grip the steering wheel, determining, with the controller and in response to receiving the hands-on request, an expected steering ratio and an expected transition duration, wherein the expected steering ratio is a specific steering ratio corresponding to a current road wheel angle as designated by the hands-on mode, wherein the expected transition duration is a period of time for transition between a current steering ratio and the expected steering ratio, determining, with the controller, a steering ratio trajectory based on the current steering ratio, the expected steering ratio, and the expected transition duration, wherein the steering ratio trajectory includes a series of reference steering ratios at corresponding times during the expected transition duration, and transitioning, with the controller, from the current steering ratio to the expected steering ratio using the steering ratio trajectory.

In various examples, the method may include transitioning from the current steering ratio to the expected steering ratio using the steering ratio trajectory by measuring a real-time road wheel angle and a real-time steering wheel angle at periodic intervals during the expected transition duration, determining a real-time steering ratio at each of the intervals based on the real-time road wheel angle and the real-time steering wheel angle measured at each interval, comparing the real-time steering ratio at each of the intervals with a corresponding reference steering ratio of the steering ratio trajectory, and transmitting a command to a steering wheel control system of the vehicle including instructions for adjusting the steering wheel to reduce a difference between the real-time steering ratio and the corresponding reference steering ratio at each of the intervals.

In various examples, the method may include determining the expected steering ratio based on, at least in part, a drive mode of the vehicle and a current speed of the vehicle.

In various examples, the method may include determining the expected transition duration is based, at least in part, on a type of the vehicle.

In various examples, the method may include determining the steering ratio trajectory is performed using an equation:

$$R_{st\,reference}(t) = R_{st\,hands\text{-}off} + (R_{st\,hands\text{-}on} - R_{st\,hands\text{-}off})(6\tau^5 - 15\tau^4 + 10\tau^3)$$

$$\text{where, } \tau = (t - t_{req})/t_{transit\,duration}.$$

In various examples, the method may include adjusting a real-time steering ratio gradually during the expected transition duration.

In various examples, the hands-on mode of the method may be a driving assistance mode wherein steering of the vehicle is entirely or partially controlled by the ADS.

In various examples, the method may include the hands-on mode of the method may be a manual mode wherein steering of the vehicle is controlled by the driver.

A system is provided for adjusting a steering wheel during a transition from a hands-off mode of a vehicle to a hands-on mode. In one example, the system includes a controller in operable communication with an automated driving system (ADS) configured for autonomous steering of the vehicle, a road wheel control system configured for controlling a road wheel angle of wheels of the vehicle in response to instructions received from the ADS or manual rotation of a steering wheel of the vehicle, and a steering wheel control system configured for adjusting a steering wheel angle of the steering wheel in response to autonomous steering of the vehicle by the ADS. The controller is configured to, by one or more processors thereof receive a hands-on request instructing a driver to grip the steering wheel prior to transitioning from a hands-off mode wherein steering of the vehicle is controlled by the ADS and the driver is not required to grip the steering wheel to a hands-on mode that requires the driver to grip the steering wheel, determine, in response to receiving the hands-on request, an expected steering ratio and an expected transition duration, wherein the expected steering ratio is a specific steering ratio corresponding to a current road wheel angle as designated by the hands-on mode, wherein the expected transition duration is a period of time for transition between a current steering ratio and the expected steering ratio, determine a steering ratio trajectory based on the current steering ratio, the expected steering ratio, and the expected transition duration, wherein the steering ratio trajectory includes a series of reference steering ratios at corresponding times during the expected transition duration, and transition from the current steering ratio to the expected steering ratio using the steering ratio trajectory.

In various examples, the controller of the system may be configured to, by the one or more processors, transition from the current steering ratio to the expected steering ratio using the steering ratio trajectory by receiving a real-time road wheel angle and a real-time steering wheel angle at periodic intervals during the expected transition duration, determining a real-time steering ratio at each of the intervals based on the real-time road wheel angle and the real-time steering wheel angle received at each interval, comparing the real-time steering ratio at each of the intervals with a corresponding reference steering ratio of the steering ratio trajectory, and transmitting a command to the steering wheel control system including instructions for adjusting the steering wheel to reduce a difference between the real-time steering ratio and the corresponding reference steering ratio at each of the intervals.

In various examples, the controller of the system may be configured to determine, by the one or more processors, the expected steering ratio based on, at least in part, a drive mode of the vehicle and a current speed of the vehicle.

In various examples, the controller of the system may be configured to determine, by the one or more processors, the expected transition duration based, at least in part, on a type of the vehicle.

In various examples, the controller of the system may be configured to determine, by the one or more processors, the steering ratio trajectory using an equation:

$$R_{st\,reference}(t) = R_{st\,hands\text{-}off} + (R_{st\,hands\text{-}on} - R_{st\,hands\text{-}off})(6\tau^5 - 15\tau^4 + 10\tau^3)$$

$$\text{where, } \tau = (t - t_{req})/t_{transit\,duration}.$$

In various examples, the controller of the system may be configured to adjust, by the one or more processors, a real-time steering ratio gradually during the expected transition duration.

In various examples, the hands-on mode may be a driving assistance mode wherein steering of the vehicle is entirely or partially controlled by the ADS.

In various examples, the hands-on mode is a manual mode wherein steering of the vehicle is controlled by the driver.

A vehicle is provided that, one example, includes a steering wheel configured for manual steering of the vehicle, an automated driving system (ADS) configured for autonomous steering of the vehicle, a road wheel control system configured for controlling a road wheel angle of wheels of the vehicle in response to instructions received from the ADS or manual rotation of the steering wheel, a steering wheel control system configured for adjusting a steering wheel angle of the steering wheel in response to autonomous steering of the vehicle by the ADS, and a controller configured to, by one or more processors thereof, receive a hands-on request instructing a driver to grip the steering wheel prior to transitioning from a hands-off mode wherein steering of the vehicle is controlled by the ADS and the driver is not required to grip the steering wheel to a hands-on mode that requires the driver to grip the steering wheel, determine, in response to receiving the hands-on request, an expected steering ratio and an expected transition duration, wherein the expected steering ratio is a specific steering ratio corresponding to a current road wheel angle as designated by the hands-on mode, wherein the expected transition duration is a period of time for transition between a current steering ratio and the expected steering ratio, determine a steering ratio trajectory based on the current steering ratio, the expected steering ratio, and the expected transition duration, wherein the steering ratio trajectory includes a series of reference steering ratios at corresponding times during the expected transition duration, and transition from the current steering ratio to the expected steering ratio using the steering ratio trajectory.

In various examples, the controller of the vehicle may be configured to, by the one or more processors, transition from the current steering ratio to the expected steering ratio using the steering ratio trajectory by receiving a real-time road wheel angle and a real-time steering wheel angle at periodic intervals during the expected transition duration, determining a real-time steering ratio at each of the intervals based on the real-time road wheel angle and the real-time steering wheel angle received at each interval, comparing the real-time steering ratio at each of the intervals with a corresponding reference steering ratio of the steering ratio trajectory, and transmitting a command to the steering wheel control system including instructions for adjusting the steering wheel to reduce a difference between the real-time steering ratio and the corresponding reference steering ratio at each of the intervals.

In various examples, the controller of the vehicle may be configured to determine, by the one or more processors, the expected steering ratio based on, at least in part, a drive mode of the vehicle and a current speed of the vehicle, and determine, by the one or more processors, the expected transition duration based, at least in part, on a type of the vehicle.

In various examples, the controller of the vehicle may be configured to determine, by the one or more processors, the steering ratio trajectory using an equation:

$$R_{st\,reference}(t) = R_{st\,hands\text{-}off} + (R_{st\,hands\text{-}on} - R_{st\,hands\text{-}off})(6\tau^5 - 15\tau^4 + 10\tau^3)$$

$$\text{where, } \tau = (t - t_{req})/t_{transit\,duration}.$$

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
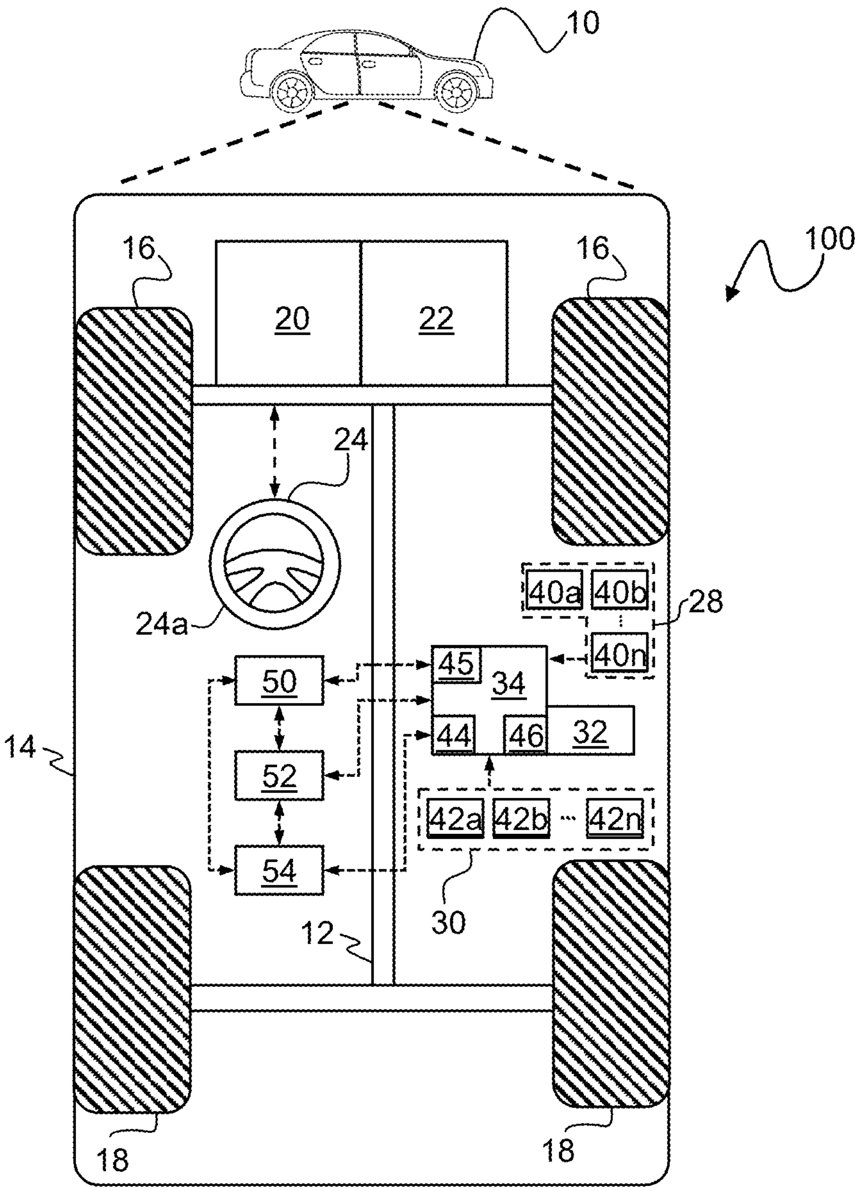
FIG. 1 is a functional block diagram illustrating a steering wheel transition system for a vehicle in accordance with various implementations.

Referring now to FIG. 1, in accordance with one or more implementations, a vehicle 10 is provided that includes a steering wheel transition system 100 that is configured to smoothly adjust a steering ratio during a transition from a hands-off mode of a vehicle to a hands-on mode of the vehicle.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In exemplary implementations, the vehicle 10 is an autonomous vehicle or is otherwise configured to support one or more autonomous operating modes, and the steering ratio transition system 100 is incorporated into the vehicle 10. In an exemplary implementation, the vehicle 10 is a so-called Level Two automation system. A Level Two system indicates "partial driving automation," referring to the driving mode-specific performance by an automated driving system to control steering, acceleration and braking in specific scenarios while a driver remains alert and actively supervises the automated driving system at all times and is capable of providing driver support to control primary driving tasks.

In another exemplary implementation, the vehicle 10 is a so-called Level Three automation system. A Level Three system indicates "conditional driving automation," referring to the driving mode-specific performance by an automated driving system to control steering, acceleration and braking in most scenarios while a driver provides driver support to control certain driving tasks.

In yet another exemplary implementation, the vehicle 10 is a so-called Level Four automation system. A Level Four system indicates "high driving automation," referring to the driving mode-specific performance by an automated driving system to control all driving tasks in specific scenarios while a driver optionally provides driver support to control driving tasks.

In yet another exemplary implementation, the vehicle 10 is a so-called Level Five automation system. A Level Five system indicates "full driving automation," referring to the driving mode-specific performance by an automated driving system to control all driving tasks in all scenarios while a driver support is optional but not required.

As shown, the vehicle 10 generally includes a propulsion system 20, a transmission system 22, a steering system 24, a sensor system 28, an actuator system 30, at least one data storage device 32, at least one controller 34, an automated driving system 50, a road wheel control system 52, and a steering wheel control system 54. The propulsion system 20 includes an engine and/or motor such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16, 18 according to selectable speed ratios. According to various examples, the transmission system 22 may include a step-ratio automatic transmission, a continuously-variable transmission, or other appropriate transmission.

The steering system 24 influences a position of the wheels 16, 18 and includes a steering wheel **24*a* operable via a steer-by-wire system. Unlike traditional steering systems, the steer-by-wire system does not include a mechanical and/or hydraulic linkage connecting the steering wheel 24*a* and a rack. Instead, the steering wheel 24*a* is operably coupled to the wheels 16, 18 via an electronic system that includes a steering wheel control system 54 (discussed below) that is configured to controllably adjust a steering ratio of the steering wheel 24*a* in real-time and providing a torque feedback to the steering wheel 24*a*** in real-time.

The sensor system 28 includes one or more sensing devices **40*a*-40*n* that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40***a*-40*n*. The sensing devices 40*a*-40*n* can include, but are not limited to, radars, lidars, global positioning systems, optical cameras, thermal cameras, ultrasonic sensors, inertial measurement units, pressure sensors, position sensors, speed sensors, steering wheel angle sensors, road wheel angle sensors, and/or other sensors.

The actuator system 30 includes one or more actuator devices 42*a*-42*n* that control one or more vehicle features such as, but not limited to, the propulsion system 20, the transmission system 22, the steering system 24, and/or the wheels 16-18.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one example, the storage device 32 comprises a program product from which a computer readable memory device can receive a program that executes one or more examples of one or more processes of the present disclosure, such as the steps of the process discussed further below in connection with FIGS. 4-6. In another example, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, examples of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the example depicted in FIG. 1. For example, the controller 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 34 may also otherwise differ from the example depicted in FIG. 1, for example in that the computer system of the controller 34 may be coupled to or may otherwise utilize one or more remote computer systems and/or other control systems.

The road wheel control system 52 may include various components configured to adjust a road wheel angle of the front wheels 16, the rear wheel 18, or both. In some examples, the road wheel control system 52 may include at least one controller having one or more processors, memory devices, and data storage devices functionally coupled with one or more of the actuators 42*a*-42*n* to selectively control the road wheel angle.

The steering wheel control system 54 may include various components configured to adjust a steering wheel angle of the steering wheel 24*a*. In some examples, the steering wheel control system 54 may include at least one controller having one or more processors, memory devices, and data storage devices functionally coupled with one or more of the actuators 42*a*-42*n* to selectively control the steering wheel angle.

Figure 2:
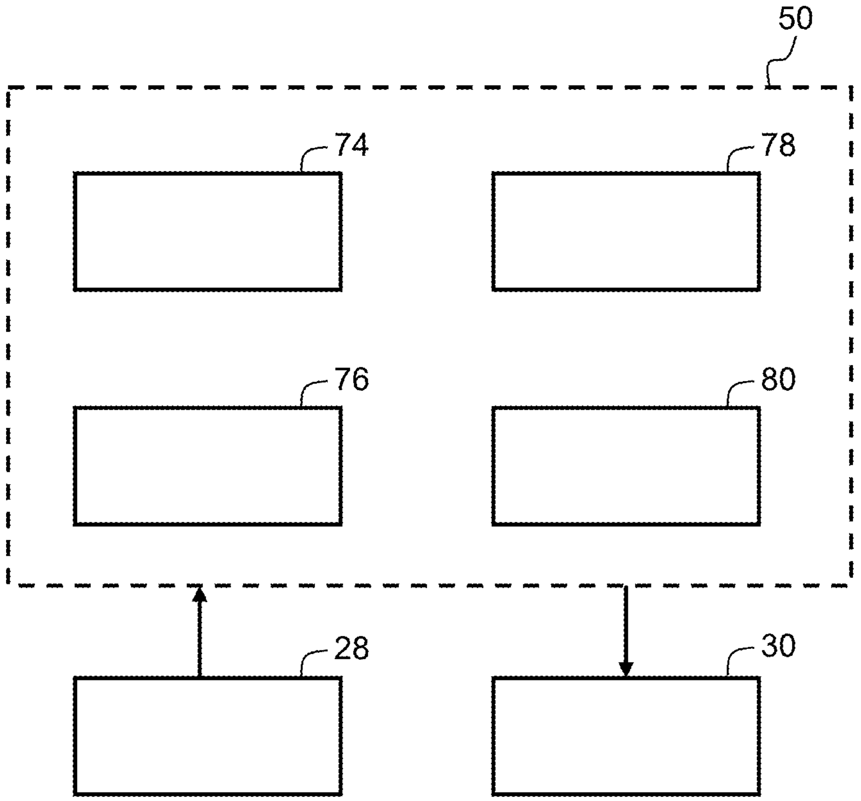
FIG. 2 is a block diagram of an automated driving system (ADS) suitable for implementation by the vehicle of FIG. 1 in accordance with various implementations.

The ADS 50 may include various components including processors, memory, and data storage devices configured to autonomously operate the vehicle 10 including, for example, vehicle acceleration, steering, and braking without human intervention. In accordance with various implementations, the instructions of the ADS 50 may be organized by function or system. For example, as shown in FIG. 2, the ADS 50 can include a sensor fusion system 74, a positioning system 76, a guidance system 78, and a vehicle control system 80. As can be appreciated, in various implementations, the instructions may be organized into any number of systems (e.g., combined, further partitioned, etc.) as the disclosure is not limited to the present examples.

In various implementations, the sensor fusion system 74 synthesizes and processes sensor data and predicts the presence, location, classification, and/or path of objects and features of the environment of the vehicle 10. In various implementations, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow given the current sensor data and vehicle pose. The vehicle control system 80 then generates control signals for controlling the vehicle 10 according to the determined path. In various implementations, the controller implements machine learning techniques to assist the functionality of thereof, such as feature detection/classification, obstruction mitigation, route traversal, mapping, sensor integration, ground-truth determination, and the like.

In one or more implementations, the guidance system 78 includes a motion planning module that generates a motion plan for controlling the vehicle 10 as it traverses along a route. The motion planning module includes a longitudinal solver module that generates a longitudinal motion plan output for controlling the movement of the vehicle 10 along the route in the general direction of travel, for example, by causing the vehicle 10 to accelerate or decelerate at one or more locations in the future along the route to maintain a desired speed or velocity. The motion planning module also includes a lateral solver module that generates a lateral motion plan output for controlling the lateral movement of the vehicle 10 along the route to alter the general direction of travel, for example, by steering the vehicle 10 at one or more locations in the future along the route (e.g., to maintain the vehicle 10 centered within a lane, change lanes, etc.). The longitudinal and lateral plan outputs correspond to the commanded (or planned) path output provided to the vehicle control system 80 for controlling the actuator system 30 to achieve movement of the vehicle 10 along the route that corresponds to the longitudinal and lateral plans.

During normal operation, the longitudinal solver module attempts to optimize the vehicle speed (or velocity) in the direction of travel, the vehicle acceleration in the direction of travel, and the derivative of the vehicle acceleration in the direction of travel, alternatively referred to herein as the longitudinal jerk of the vehicle 10, and the lateral solver module attempts to optimize one or more of the steering angle, the rate of change of the steering angle, and the acceleration or second derivative of the steering angle, alternatively referred to herein as the lateral jerk of the vehicle 10. In this regard, the steering angle can be related to the curvature of the path or route, and any one of the steering angle, the rate of change of the steering angle, and the acceleration or second derivative of the steering angle can be optimized by the lateral solver module, either individually or in combination.

In exemplary implementations, the guidance system 78 supports a hands-free autonomous operating mode that controls steering, acceleration and braking while it is enabled and operating to provide lane centering while attempting to maintain a driver-selected speed and/or following distance (or gap time) relative to other vehicles using the current sensor data (or obstacle data) provided by the sensor fusion system 74 and the current vehicle pose provided by the positioning system 76. In the autonomous operating mode, the guidance system 78 includes or otherwise implements a lane change coordinator that analyzes route information (if available) in addition to data or other information from the sensor fusion system 74, the positioning system 76 and potentially other modules or systems to determine whether or not to initiate and execute a lane change from a current lane of travel to an adjacent lane of travel, for example, based on presence of slower moving traffic within the current lane of travel ahead of the vehicle 10 (e.g., to overtake or pass another vehicle), whether or not the current lane is ending or merging into an adjacent lane, whether a lane change is required to maintain travel along the desired route, and/or the like. In this regard, the lane change coordinator may automatically determine when to initiate a lane change and automatically configure the lateral solver module and/or the motion planning module to generate a corresponding lateral plan to change lanes in the desired manner and provide the lateral plan to the vehicle control system 80, which automatically generates corresponding control signals for autonomously controlling the actuator system 30 to maneuver the vehicle 10 and execute the lane change.

Figure 3:
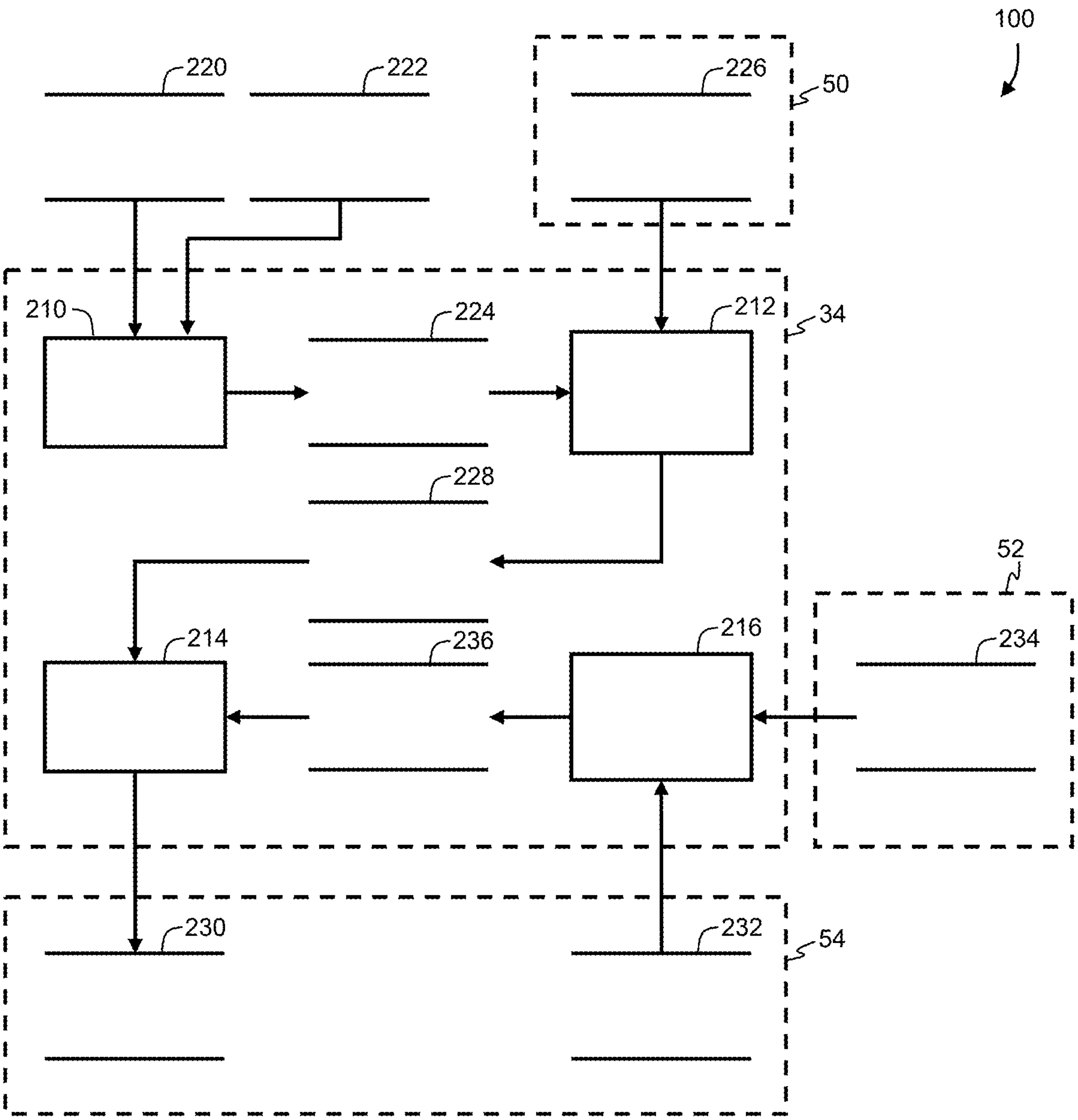
FIG. 3 is a dataflow diagram of a steering wheel transition system suitable for use with the ADS of FIG. 2 in the vehicle of FIG. 1 in accordance with various implementations

With reference to FIG. 3 and with continued reference to FIGS. 1-2, a dataflow diagram illustrates elements of the steering wheel transition system 100 of FIG. 1 in accordance with various examples. As can be appreciated, various examples of the steering wheel transition system 100 according to the present disclosure may include any number of modules embedded within the controller 34 which may be combined and/or further partitioned to similarly implement systems and methods described herein. Furthermore, inputs to the steering wheel transition system 100 may be received from other control modules (not shown) associated with the vehicle 10, and/or determined/modeled by other sub-modules (not shown) within the controller 34. Furthermore, the inputs might also be subjected to preprocessing, such as sub-sampling, noise-reduction, normalization, feature-extraction, missing data reduction, and the like. In various examples, the steering wheel transition system 100 includes a transition preparation module 210, a steering ratio trajectory module 212, a steering wheel (SW) control module 214, and a steering ratio monitoring module 216.

In various examples, the transition preparation module 210 receives as input hands-on request data 220 while the vehicle 10 is operating in a hands-off mode wherein steering of the vehicle 10 is controlled by the ADS 50 of the vehicle 10 and the driver is not required to have their hands on the steering wheel **24*a* (i.e., hands-off). The hands-on request data 220 includes various data indicating that a hands-on request has been generated, that is, a request for the driver to grip the steering wheel 24*a* and take steering control of the vehicle 10 from the ADS 50**.

The hands-on request may be generated in response to various events. For example, the ADS 50 may determine that a currently active hands-off mode is no longer available, that is, that conditions or criteria for operating the vehicle 10 in the hands-off mode are no longer met. For example, changes in the driving conditions may result in the ADS 50 generating the hands-on request (e.g., sensor system 30 cannot detect lane lines, end of an auto park assist mode, etc.). As another example, the hands-on request may be generated in response to the driver deactivating the hands-off mode or otherwise indicating a desire to regain or override the steering control. For example, a touch sensor of the sensor system 28 of the vehicle 10 may detect that the driver has gripped the steering wheel 24*a*. Alternatively, or in addition, a steering wheel torque sensor of the sensor system 28 may detect torque on the steering wheel 24*a* in response to the driver turning the steering wheel 24*a*. As yet another example, the hands-on request may be generated in response to a transition between the hands-off mode to a hands-on driving assistance mode, wherein steering of the vehicle 10 is still controlled by the ADS 50 of the vehicle 10 but the driver is required to have their hands on the steering wheel 24*a* (e.g., hands-on lane centering assist mode, hands-on lane keep assist mode, etc.). As such, the hands-on request data 220 may be generated by various systems onboard the vehicle 10, such as the ADS 50 or the sensor system 28.

In various examples, the transition preparation module 210 receives as input vehicle data 222 that includes various data indicating vehicle information and/or operating conditions that may be used by the transition preparation module 210 such as, but not limited to, a currently active drive mode (e.g., normal, sport, off-road, etc.), a current speed of the vehicle 10 (e.g., specific speed or a category of speed designated by one or more thresholds), a type of the vehicle 10 (e.g., weight, dimensions, performance, etc.), a current (hands-off) road wheel angle, and a current (hands-off) steering wheel angle.

The transition preparation module 210 processes the hands-on request data 220 and the vehicle data 222 and determines an expected (hands-on) steering ratio and an expected transition duration for transitioning between the hands-off steering ratio and the hands-on steering ratio. As a specific nonlimiting example, a hands-off steering ratio may be determined to be 0.2 (e.g., 100 road wheel angle and 50° steering wheel angle), a hands-on steering ratio may be determined to be 0.067 (e.g., 10° road wheel angle and 150° steering wheel angle), and an expected transition duration may be determined to be two seconds. The transition preparation module 210 generates transition data 224 that includes various data indicating the determined hands-on steering ratio and an expected transition duration.

In various examples, the steering ratio trajectory module 212 receives as input the transition data 224 generated by the transition preparation module 210. In various examples, the steering ratio trajectory module 212 receives as input hands-off steering ratio data 226 generated by, for example, the ADS 50 that includes various data indicating the hands-off steering ratio. The steering ratio trajectory module 212 processes the transition data 224 and the hands-off steering ratio data 226, and generates or determines a steering ratio trajectory (a "minimum jerk" trajectory) configured to be used as a reference for a real-time calculated steering ratio to follow during the transition between the hands-off steering ratio and the hands-on steering ratio. The steering ratio trajectory is configured to provide a smooth transition that minimizes or reduces a jerking motion, that is, unexpected torque applied via the steering wheel 24*a* as the driver takes steering control of the vehicle 10. In some examples, the steering ratio trajectory may be determined using equation (1) below.

$$R_{st\,reference}(t) = R_{st\,hands\text{-}off} + (R_{st\,hands\text{-}on} - R_{st\,hands\text{-}off})(6\tau^5 - 15\tau^4 + 10\tau^3) \quad \text{Eq. (1)}$$

$$\text{where, } \tau = (t - t_{req})/t_{transit\,duration}$$

where $R_{st\,reference}$ is the steering ratio trajectory, $R_{st\,hands\text{-}off}$ is the hands-off steering ratio, $R_{st\,hands\text{-}on}$ is the hands-on steering ratio, $t_{transit\,duration}$ is the expected transition duration, $t_{req}$ is the time at which the hands-on request is received, and t is the current time (real-time). The steering ratio trajectory module 212 generates steering wheel trajectory data 228 that includes various data indicating the steering ratio trajectory.

In various examples, the SW control module 214 receives as input the steering ratio trajectory data 228 generated by the steering ratio trajectory module 212. The SW control module 214 processes the steering ratio trajectory data 228 and generates SW control data 230 that includes various data indicating a command or series of commands to the steering wheel control system 54 including instructions for adjusting the steering wheel 24*a* to transition to the expected steering ratio based on the steering ratio trajectory. The SW control module 214 transmits the SW control data 230 to the steering wheel control system 54.

In various examples, the steering ratio monitoring module 216 receives as input steering wheel angle data 232 generated by the SW control system 54. The steering wheel angle data 232 includes various data indicating a current (real-time) steering wheel angle, for example, as sensed by a steering wheel angle sensor of the sensor system 28. In various examples, the steering ratio monitoring module 216 receives as input road wheel (RW) angle data 234 generated by the RW control system 52. The road wheel angle data 234 includes various data indicating a current (real-time) road wheel angle, for example, as sensed by a road wheel angle sensor of the sensor system 28 (e.g., a rack position sensor).

The steering ratio monitoring module 216 processes the SW angle data 232 and the RW angle data 234, and determines the current (real-time) steering ratio. The steering ratio monitoring module 216 generates steering ratio data 236 including various data indicating the determined real-time steering ratio. In some examples, the real-time steering ratio may be determined using equation (2) below.

$$R_{st\,measured} = \frac{\theta_{RW\,measured}(t)}{\theta_{HW\,measured}(t)} \quad \text{Eq. (2)}$$

where $R_{st\,measured}$ is the real-time steering ratio, $\theta_{RW\,measured}$ is the real-time road wheel angle, and $\theta_{HW\,measured}$ is the real-time steering wheel angle.

In various examples, the SW control module 214 receives as input the steering ratio data 236 generated by the steering ratio monitoring module 216. The SW control module 214 processes the steering ratio data 236, compares the real-time steering ratio to the steering ratio trajectory, and updates the SW control data 230 to adjust the steering wheel 24*a* to minimize the difference (i.e., error) between the real-time steering ratio and a reference steering ratio of the steering ratio trajectory at the current time.

The SW control module 214 transmits the SW control data 230 to the SW control system 54. This process may be performed at periodic intervals during the transition until the real-time steering ratio is equal to the hands-on steering ratio. This process may promote a smooth alignment of the steering wheel angle and the steering wheel feedback torque with the driver's expectations.

In some examples, the steering wheel control algorithm may be as represented in equation (3) below.

$$T_{HW\,desired} = PID \text{ control } (R_{st\,reference} - R_{st\,measured}) \qquad \text{Eq. (3)}$$

where $T_{HW\,desired}$ is a desired steering wheel feedback torque and PID control an algorithm executed by a proportional-integral-derivative (PID) controller configured to minimize the difference between the reference steering wheel angle and the current steering wheel angle.

Figure 4:
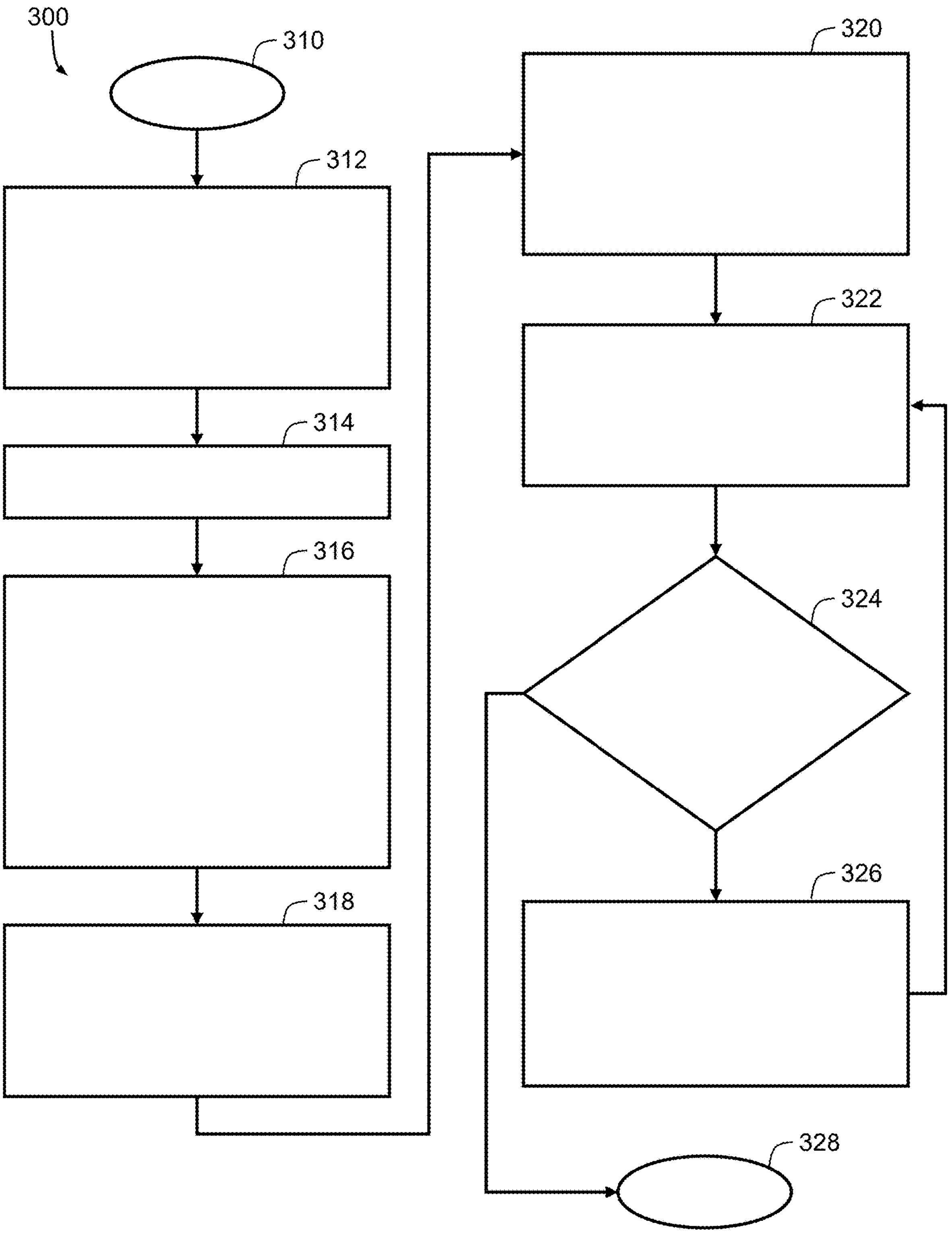
FIG. 4 depicts a flow diagram of an exemplary method for steering wheel transition while changing from a hands-off mode to a hands-on mode in accordance with various implementations.

With reference now to FIG. 4 and with continued reference to FIGS. 1-3, a flowchart provides a method 300 for operating a vehicle (e.g., the vehicle 10 as performed by the steering wheel transition system 100), in accordance with various examples. As can be appreciated in light of the disclosure, the order of operation within the method 300 is not limited to the sequential execution as illustrated in FIG. 3, but may be performed in one or more varying orders as applicable and in accordance with the present disclosure. In various examples, the method 300 can be scheduled to run based on one or more predetermined events, and/or can run continuously during operation of the vehicle 10.

In one example, the method 300 may start at 310. At 312, the method 300 may include operating the vehicle in a hands-off mode wherein steering of the vehicle is controlled by an ADS of the vehicle (e.g., the ADS 50) and the driver is not required to have their hands on the steering wheel, that is, the vehicle is steered automatically without intervention by the driver.

At 314, the method 300 may include receiving, by a controller having one or more processors (e.g., the controller 34 and the processor 44), a hands-on request, that is, a request for the driver to grip the steering wheel and take steering control of the vehicle from the ADS.

At 316, the method 300 may include determining, with the controller and in response to receiving the hands-on request, an expected (hands-on) steering ratio and an expected transition duration for transitioning between a current (hands-off) steering ratio and the hands-on steering ratio. The hands-on steering ratio may be determined based on vehicle operating parameters, for example, as designated by an active vehicle mode (e.g., normal, sport, off-road, etc.), and a current speed of the vehicle (e.g., high speed or low speed). The expected transition duration may be determined based on the type of vehicle (e.g., standard size, large-size, performance, etc.).

At 318, the method 300 may include determining, with the controller, a steering ratio trajectory based on the hands-on steering ratio, the hands-off steering ratio, and the expected transition duration. The steering ratio trajectory includes reference steering ratios relative to time that may be subsequently used for the real-time calculated steering ratio to follow during the transition from the hands-off steering ratio to the hands-on steering ratio. In some examples, the steering ratio trajectory may be determined using the previously discussed equation (1).

At 320, the method 300 may include transmitting, with the controller, a command or series of commands to a steering wheel control system including instructions for adjusting the steering wheel to transition to the hands-on steering ratio based on the steering ratio trajectory.

At 322, the method 300 may determining, with the controller, a real-time steering ratio during the transition based on a current (real-time) road wheel angle and a current (real-time) steering wheel angle.

At 324, the method 300 may include determining whether the real-time steering ratio is equal to the hands-on steering ratio.

If the real-time steering ratio is not equal to the hands-on steering ratio at 324, the method 300 may include, at 326, adjusting, with the controller, the real-time steering wheel angle to minimize an error between the real-time steering ratio and the reference steering ratio at the corresponding time, and thereby smoothly align the steering wheel angle and the steering wheel feedback torque with the driver's expectations.

If the real-time steering ratio is equal to the hands-on steering ratio at 324, the transition is complete and the method 300 may end at 328. Although the method 300 is discussed herein in reference to a fixed road wheel angle, it should be understood that the method 300 is applicable to use of a variable steering ratio in situations in which the road wheel angle is changing.

Figure 5:
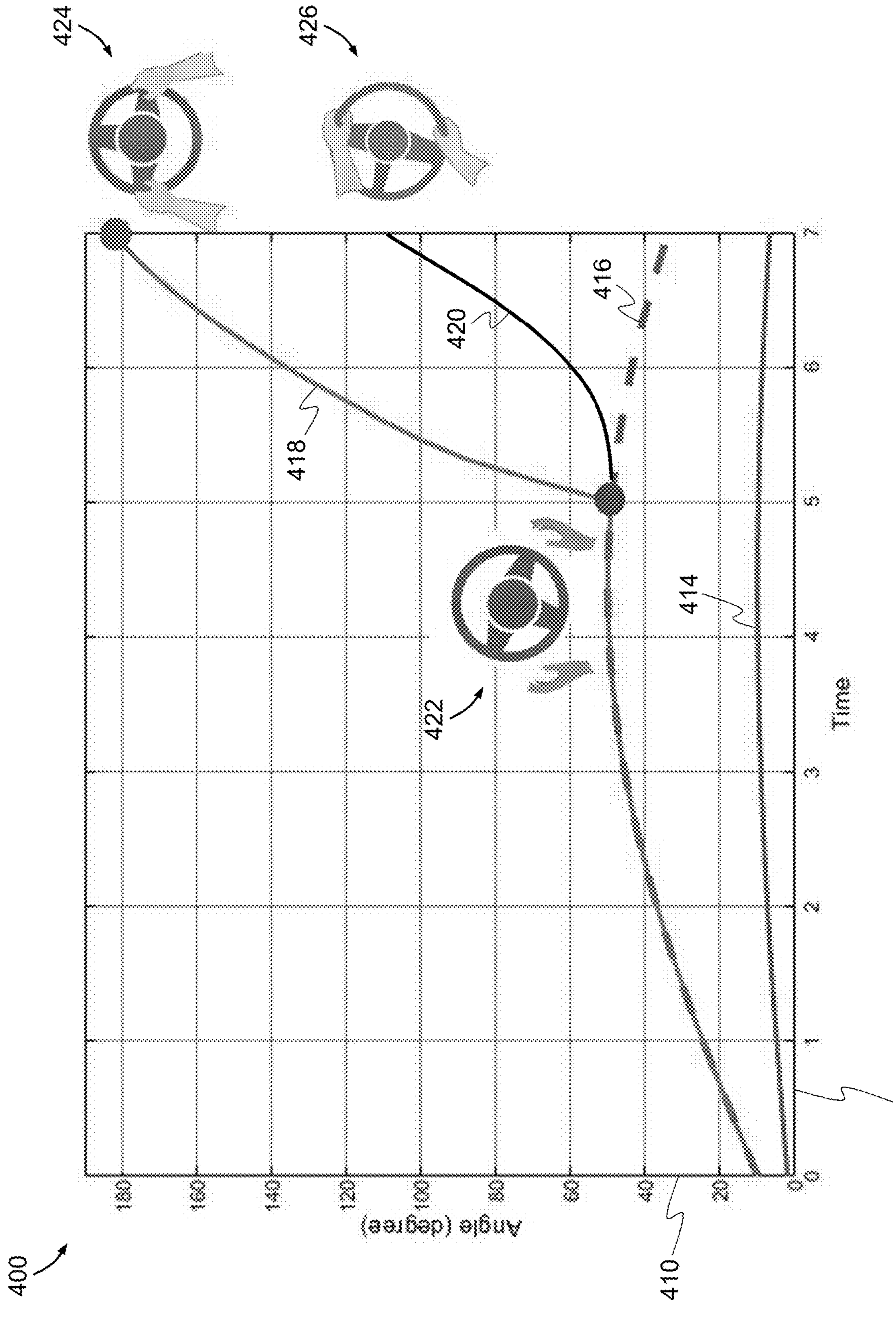
FIGS. 5-7 include graphs representing steering wheel angle, steering ratio, and steering wheel feedback torque over time during transition from a hands-off mode to a hands-on mode in a vehicle in accordance with various implementations.
Figure 6:
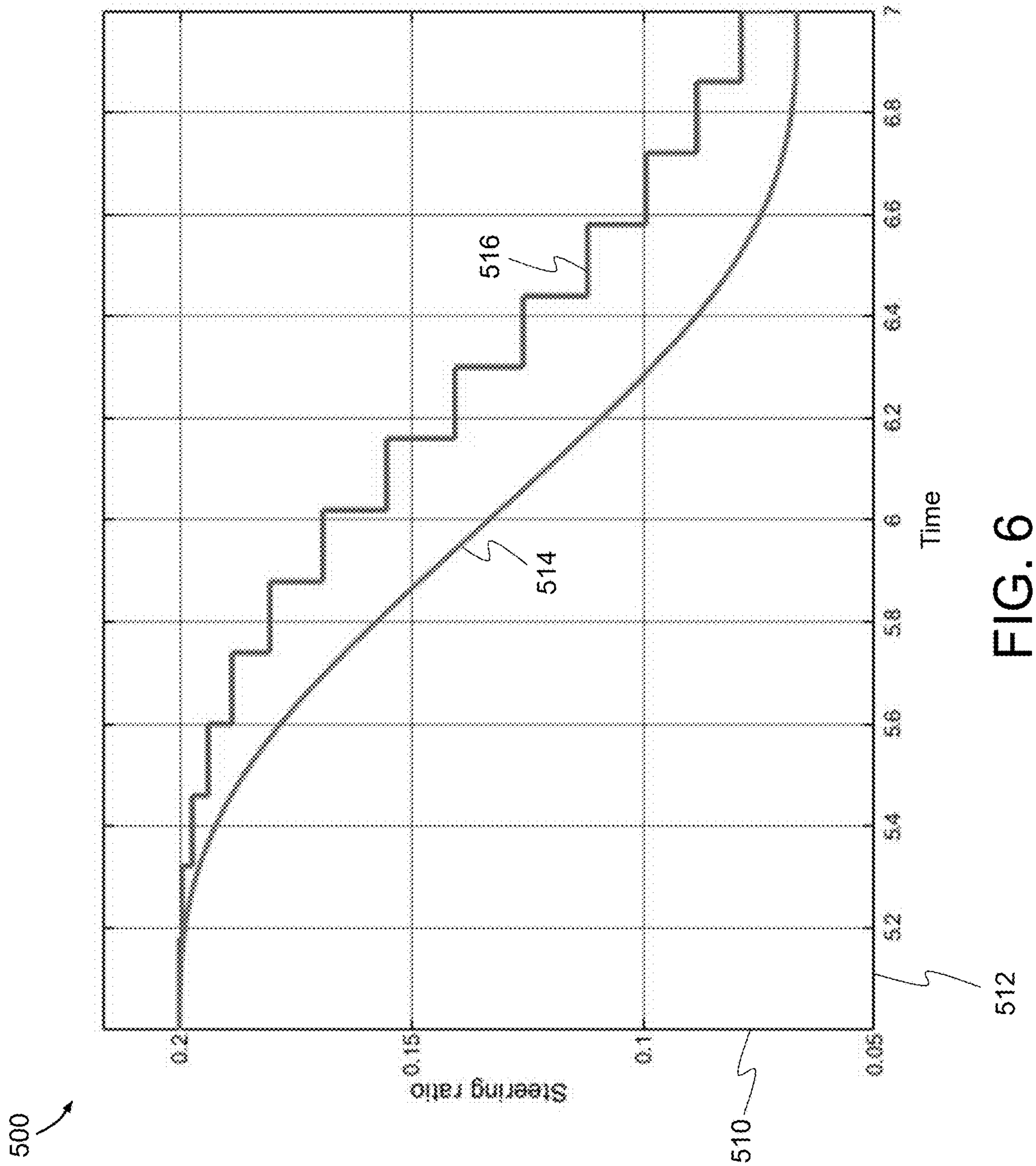
Figure 7:
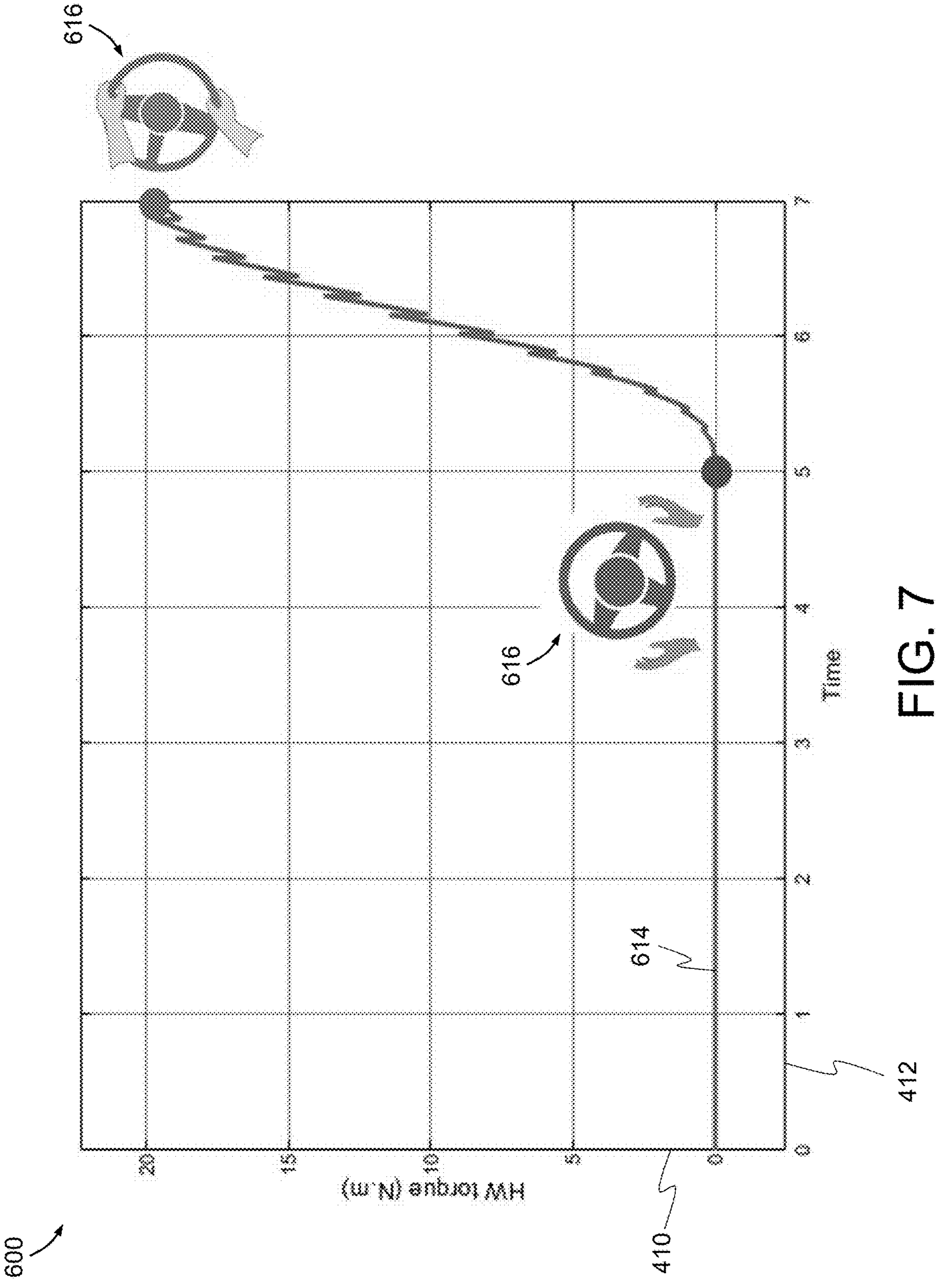

Referring now to FIGS. 5-7, various aspects of the system 100 are explained in reference to specific, non-limiting examples over a representative period of time (seven seconds). In this example, the vehicle 10 is initially operating in a hands-off mode (i.e., the first five seconds), a hands-on request is generated (i.e., at time equal to five seconds), and then the steering ratio is transitioned from a hands-off steering ratio to a hands-on steering ratio (i.e., the last two seconds).

FIG. 5 includes a graph 400 representing the steering wheel angle of the vehicle 10 during the transition with and without use of the system 100 (y-axis 410 is angle in degrees, x-axis 412 is time in seconds). In FIG. 5, the road wheel angle is represented by a first line 414. During the first five seconds, the steering wheel angle follows a hands-off steering ratio designated by the hands-off mode along a second line 416. A first symbol 412 represents that the driver is not gripping the steering wheel 24*a* during this time period. In response to receiving the hands-on request, the steering ratio transitions from the hands-off steering ratio to a hands-on steering ratio designated by the hands-on mode. In a first example, the steering ratio is transitioned without the system 100 along a third line 418 until the seven second time at which the driver grips the steering wheel 24*a* as represented by the second symbol 424. In this example, the transition is relatively abrupt and results in a large change to the steering wheel angle (i.e., about 40 degrees to about 180 degrees). In a second example, the steering ratio is transitioned with the system 100 along a fourth line 420 until the seven second time at which the driver grips the steering wheel 24*a* as represented by the third symbol 426. In this example, the transition is gradual and results in a much smaller change to the steering wheel angle (i.e., about 40 degrees to about 105 degrees).

FIG. 6 includes a graph 500 representing the steering ratio during the transition (y-axis 510 is steering ratio, x-axis 512 is time in seconds). The steering ratio trajectory determined by the system 100 is represented by a fifth line 514, and the real-time steering ratio is represented by a sixth line 516. As represented, the real-time steering ratio is measured and adjusted at intervals during the transition to attempt to follow the steering ratio trajectory.

FIG. 7 includes a graph 600 representing steering wheel feedback torque during the transition (y-axis 610 is steering ratio in N*m, x-axis 612 is time in seconds). The steering wheel feedback torque is represented by a seventh line 416 which is initially constant at zero while in the hands-off mode and while the driver is not gripping the steering wheel 24*a* as represented by a fourth symbol 616. The steering wheel feedback torque then transitions to an expected steering wheel feedback torque during the transition period. The expected steering wheel feedback torque may be determined based, at least in part, by the hands-on mode. In this example, the steering wheel feedback torque is increased gradually to about 20 N*m at which point the driver grips the steering wheel 24*a* as represented by the fifth symbol 618.

The systems and methods disclosed herein provide various benefits over certain existing systems and methods. For example, the system 100 is configured to gradually adjust the steering ratio from the hands-off steering ratio to the hands-on steering ratio in a manner that is smooth and avoids or reduces the likelihood of a jerky motion that may startle a driver.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

operating a vehicle in a hands-off mode wherein steering of the vehicle is controlled by an automated driving system (ADS) of the vehicle and a driver is not required to grip a steering wheel of the vehicle, wherein the steering wheel is a steer-by-wire system and the steering ratio and torque feedback of the steering wheel are selectively adjusted by a steering wheel control system of the vehicle;

receiving, by a controller having one or more processors, a hands-on request instructing the driver to grip the steering wheel prior to transitioning from the hands-off mode to a hands-on mode that requires the driver to grip the steering wheel;

determining, with the controller and in response to receiving the hands-on request, an expected steering ratio and an expected transition duration, wherein the expected steering ratio is a specific steering ratio corresponding to a current road wheel angle as designated by the hands-on mode, wherein the expected transition duration is a period of time for transition between a current steering ratio and the expected steering ratio;

determining, with the controller, a steering ratio trajectory based on the current steering ratio, the expected steering ratio, and the expected transition duration, wherein the steering ratio trajectory includes a series of reference steering ratios at corresponding times during the expected transition duration; and transitioning, with the controller, from the current steering ratio to the expected steering ratio using the steering ratio trajectory.

2. The method of claim 1, wherein transitioning from the current steering ratio to the expected steering ratio using the steering ratio trajectory includes:

measuring a real-time road wheel angle and a real-time steering wheel angle at periodic intervals during the expected transition duration;

determining a real-time steering ratio at each of the intervals based on the real-time road wheel angle and the real-time steering wheel angle measured at each interval;

comparing the real-time steering ratio at each of the intervals with a corresponding reference steering ratio of the steering ratio trajectory; and transmitting a command to a steering wheel control system of the vehicle including instructions for adjusting the steering wheel to reduce a difference between the real-time steering ratio and the corresponding reference steering ratio at each of the intervals.

3. The method of claim 1, wherein the expected steering ratio is based on, at least in part, a drive mode of the vehicle and a current speed of the vehicle.

4. The method of claim 1, wherein the expected transition duration is based, at least in part, on a type of the vehicle.

5. The method of claim 1, wherein the steering ratio trajectory is determined using an equation:

$$R_{st\,reference}(t) = R_{st\,hands\text{-}off} + (R_{st\,hands\text{-}on} - R_{st\,hands\text{-}off})\left(6\tau^5 - 15\tau^4 + 10\tau^3\right)$$

$$\text{where, } \tau = (t - t_{req})/t_{transit\,duration}.$$

6. The method of claim 1, wherein a real-time steering ratio is adjusted gradually during the expected transition duration.

7. The method of claim 1, wherein the hands-on mode is a driving assistance mode wherein steering of the vehicle is entirely or partially controlled by the ADS.

8. The method of claim 1, wherein the hands-on mode is a manual mode wherein steering of the vehicle is controlled by the driver.

9. A system for a vehicle, comprising:

a controller in operable communication with an automated driving system (ADS) configured for autonomous steering of the vehicle, a road wheel control system configured for controlling a road wheel angle of wheels of the vehicle in response to instructions received from the ADS or manual rotation of a steering wheel of the vehicle, and a steering wheel control system configured for adjusting a steering wheel angle and torque feedback of the steering wheel in response to autonomous steering of the vehicle by the ADS, wherein the controller is configured to, by one or more processors thereof:

receive a hands-on request instructing a driver to grip the steering wheel prior to transitioning from a hands-off mode wherein steering of the vehicle is controlled by the ADS and the driver is not required to grip the steering wheel to a hands-on mode that requires the driver to grip the steering wheel;

determine, in response to receiving the hands-on request, an expected steering ratio and an expected transition duration, wherein the expected steering ratio is a specific steering ratio corresponding to a current road wheel angle as designated by the hands-on mode, wherein the expected transition duration is a period of time for transition between a current steering ratio and the expected steering ratio;

determine a steering ratio trajectory based on the current steering ratio, the expected steering ratio, and the expected transition duration, wherein the steering ratio trajectory includes a series of reference steering ratios at corresponding times during the expected transition duration; and transition from the current steering ratio to the expected steering ratio using the steering ratio trajectory.

10. The system of claim 9, wherein the controller is configured to, by the one or more processors, transition from the current steering ratio to the expected steering ratio using the steering ratio trajectory by:

receiving a real-time road wheel angle and a real-time steering wheel angle at periodic intervals during the expected transition duration;

determining a real-time steering ratio at each of the intervals based on the real-time road wheel angle and the real-time steering wheel angle received at each interval;

comparing the real-time steering ratio at each of the intervals with a corresponding reference steering ratio of the steering ratio trajectory; and transmitting a command to the steering wheel control system including instructions for adjusting the steering wheel to reduce a difference between the real-time steering ratio and the corresponding reference steering ratio at each of the intervals.

11. The system of claim 9, wherein the controller is configured to determine, by the one or more processors, the expected steering ratio based on, at least in part, a drive mode of the vehicle and a current speed of the vehicle.

12. The system of claim 9, wherein the controller is configured to determine, by the one or more processors, the expected transition duration based, at least in part, on a type of the vehicle.

13. The system of claim 9, wherein the controller is configured to determine, by the one or more processors, the steering ratio trajectory using an equation:

$$R_{st\,reference}(t) = R_{st\,hands\text{-}off} + (R_{st\,hands\text{-}on} - R_{st\,hands\text{-}off})(6\tau^5 - 15\tau^4 + 10\tau^3)$$

$$\text{where, } \tau = (t - t_{req})/t_{transit\,duration}.$$

14. The system of claim 9, wherein the controller is configured to adjust, by the one or more processors, a real-time steering ratio gradually during the expected transition duration.

15. The system of claim 9, wherein the hands-on mode is a driving assistance mode wherein steering of the vehicle is entirely or partially controlled by the ADS.

16. The system of claim 9, wherein the hands-on mode is a manual mode wherein steering of the vehicle is controlled by the driver.

17. A vehicle, comprising:

a steering wheel configured for manual steering of the vehicle;

an automated driving system (ADS) configured for autonomous steering of the vehicle;

a road wheel control system configured for controlling a road wheel angle of wheels of the vehicle in response to instructions received from the ADS or manual rotation of the steering wheel;

a steering wheel control system configured for adjusting a steering wheel angle and a torque feedback of the steering wheel in response to autonomous steering of the vehicle by the ADS;

a controller configured to, by one or more processors thereof:

receive a hands-on request instructing a driver to grip the steering wheel prior to transitioning from a hands-off mode wherein steering of the vehicle is controlled by the ADS and the driver is not required to grip the steering wheel to a hands-on mode that requires the driver to grip the steering wheel;

determine, in response to receiving the hands-on request, an expected steering ratio and an expected transition duration, wherein the expected steering ratio is a specific steering ratio corresponding to a current road wheel angle as designated by the hands-on mode, wherein the expected transition duration is a period of time for transition between a current steering ratio and the expected steering ratio;

determine a steering ratio trajectory based on the current steering ratio, the expected steering ratio, and the expected transition duration, wherein the steering ratio trajectory includes a series of reference steering ratios at corresponding times during the expected transition duration; and transition from the current steering ratio to the expected steering ratio using the steering ratio trajectory.

18. The vehicle of claim 17, wherein the controller is configured to, by the one or more processors, transition from the current steering ratio to the expected steering ratio using the steering ratio trajectory by:

receiving a real-time road wheel angle and a real-time steering wheel angle at periodic intervals during the expected transition duration;

determining a real-time steering ratio at each of the intervals based on the real-time road wheel angle and the real-time steering wheel angle received at each interval;

comparing the real-time steering ratio at each of the intervals with a corresponding reference steering ratio of the steering ratio trajectory; and transmitting a command to the steering wheel control system including instructions for adjusting the steering wheel to reduce a difference between the real-time steering ratio and the corresponding reference steering ratio at each of the intervals.

19. The vehicle of claim 17, wherein the controller is configured to determine, by the one or more processors, the expected steering ratio based on, at least in part, a drive mode of the vehicle and a current speed of the vehicle, and determine, by the one or more processors, the expected transition duration based, at least in part, on a type of the vehicle.

20. The vehicle of claim 17, wherein the controller is configured to determine, by the one or more processors, the steering ratio trajectory using an equation:

$$R_{st\,reference}(t) = R_{st\,hands\text{-}off} + (R_{st\,hands\text{-}on} - R_{st\,hands\text{-}off})(6\tau^5 - 15\tau^4 + 10\tau^3)$$

$$\text{where, } \tau = (t - t_{req})/t_{transit\,duration}.$$

* * * * *